(12) United States Patent
Lambert et al.

(10) Patent No.: US 6,808,757 B1
(45) Date of Patent: Oct. 26, 2004

(54) METHOD OF COATING A SUBSTRATE

(75) Inventors: Nigel Lambert, Hants (GB); Adrian Strachan, Dorset (GB); Roger Wallis, Dorset (GB); Vincent Wright, East Sussex (GB)

(73) Assignee: Decorative Surfaces Holding AB, Perstorp (SE)

( * ) Notice: Subject to any disclaimer, the term of this patent is extended or adjusted under 35 U.S.C. 154(b) by 0 days.

(21) Appl. No.: 09/463,560

(22) PCT Filed: Jul. 3, 1998

(86) PCT No.: PCT/SE98/01309

§ 371 (c)(1),
(2), (4) Date: Mar. 21, 2000

(87) PCT Pub. No.: WO99/06489

PCT Pub. Date: Feb. 11, 1999

(30) Foreign Application Priority Data

Jul. 31, 1997 (GB) .............................. 9716194

(51) Int. Cl.[7] .............................. C08J 7/18; C08J 7/04; C08F 2/48; B32B 27/30; B32B 27/28
(52) U.S. Cl. ........................ 427/495; 427/493; 427/508; 428/411.1
(58) Field of Search ................................ 427/493, 495, 427/508, 514, 512; 428/411.1, 500

(56) References Cited

U.S. PATENT DOCUMENTS

| | | | |
|---|---|---|---|
| 3,918,393 A | 11/1975 | Hahn | |
| 4,143,468 A | 3/1979 | Novotny et al. | |
| 4,557,975 A | 12/1985 | Moore | |
| 4,689,243 A | * 8/1987 | Sasaki et al. | |
| 4,902,378 A | * 2/1990 | Ouderkirk et al. | |
| 5,047,261 A | 9/1991 | Moussa et al. | |
| 5,188,900 A | 2/1993 | Revis et al. | |
| 5,446,073 A | 8/1995 | Jonsson et al. | |
| 5,633,049 A | * 5/1997 | Bilkadi et al. | 427/508 |
| 6,737,122 B2 | * 5/2004 | Beck et al. | 427/492 |

FOREIGN PATENT DOCUMENTS

| | | |
|---|---|---|
| EP | 0071948 | 2/1983 |
| EP | 0086474 | 8/1983 |
| EP | 0096951 | 12/1983 |
| EP | 0549116 A3 | 11/1992 |
| EP | 0549116 A2 | 11/1992 |
| EP | 0618237 | 10/1994 |
| GB | 1345905 | 2/1974 |
| GB | 1372374 | 10/1974 |
| GB | 1580302 | 12/1980 |
| GB | 2098617 | 11/1982 |
| GB | 2127714 | 4/1984 |
| WO | 9422596 | 10/1994 |

* cited by examiner

Primary Examiner—Marianne Padgett
(74) Attorney, Agent, or Firm—Stevens, Davis, Miller & Mosher, L.L.P.

(57) ABSTRACT

A method of coating a substrate comprises the steps of applying a coating composition to selected areas of the substrate. The coating composition comprises a mixture including at least a reactive part. The reactive part comprises between 30% and 100% multi-functional material, and is photoinitiator free. The coated substrate is exposed, in a curing zone, to ultra-violet light from at least one lamp which has a power output of at least 140 watts per linear centimeter. The ultra-violet light initiates curing of the coating. A substantially inert atmosphere is maintained in the curing zone where the substrate is exposed to the ultra-violet light.

23 Claims, 3 Drawing Sheets

METHOD OF COATING A SUBSTRATE

The present invention relates to a method of coating a substrate.

It has been proposed previously to provide various coatings which can be applied to a substrate in a liquid form and which can then be cured to form a solid coating. Typically, the liquid coating incorporates unsaturated organic compounds which include C=C double bonds. These compounds present within the liquid coating are effectively polymerised during the curing process.

It has been proposed to effect the curing utilising high energy electron radiation. Typically electrons are delivered by an electron beam accelerator which normally operates at a voltage in excess of 150 kVe, although alternatively a nuclear source may be utilised. The radiation breaks some of the C=C double bonds present in the unsaturated organic material, generating free radicals which initiate free radical polymerisation of the remaining material. The equipment necessary to carry out this process is costly to purchase and has to be specially shielded to avoid any leakage of gamma radiation.

There have been many proposals concerning coatings which can be cured, in response to ultra-violet light, involving free radical initiated polymerisation. Typically these coatings utilise a photo-initiator. A photo-initiator in this process is a material that absorbs light, and generates free radicals. The free radicals initiate the polymerisation of the coating. Photo-initiators are generally expensive, and can give rise to problems. For example, they can create an undesirable odour or taste (which may be relevant when the coating is going to be in contact with a food product) and can also cause "yellowing", which is a tendency for the cured coating to adopt a yellow colour over the course of time.

It has been proposed to provide a coating which can be cured on exposure to ultra-violet light which does not incorporate a photo-initiator. A coating of this type is disclosed in U.S. Pat. No. 5,446,073. This Specification teaches a formulation which has a balance of "acceptor" and "donor" species. The process described in U.S. Pat. No. 5,446,073 has not yet been adopted by industry, primarily because the reactive materials required are not readily commercially available. Also, the curing process is relatively slow with cure times typically being measured in terms of minutes. A further disadvantage of this technique is that it requires a combination of electron donating monomers and electron accepting monomers of relatively low molecular weight, and monomers in general are regarded as being prone to shrinkage during cure and are also regarded as being toxic since they may relatively easily penetrate the skin.

It has been discovered that short wavelength light may be used to effect a cure by direct fragmentation, in a similar way to the electron beam accelerator. Thus, it has been proposed to use light from excimer lamps, which have a wavelength of 172 nm, to cure radiation curable coatings without the use of a photo-initiator. However, this technique has only been used successfully with very thin coatings, typically coatings less than 1 $\mu$m thick. The excimer energy is not able to penetrate readily into a coating which is of a greater thickness without excessive heat being generated. If an excimer lamp were used to irradiate a 10 $\mu$m thick coating, it would produce a "cured skin" on the surface, but not a complete cure.

The present invention seeks to provide a UV cured coating in which the disadvantages of prior proposals are obviated or reduced.

According to one aspect of the present invention, there is provided a method of coating a substrate, the method comprising the steps of applying a coating composition to at least selected areas of the substrate, exposing the coated substrate to ultra-violet light from at least one lamp having a power output of at least 140 watts per linear centimeter in a curing zone, to initiate curing of the coating, the coating composition comprising a mixture including at least a reactive part comprising between 30% and 100% multi-functional material and being photo-initiator-free, including the step of maintaining a substantially inert atmosphere in the curing zone where the substrate is exposed to said ultra-violet light.

The preferred multi-functional materials have a functionality of at least three.

Preferably, the inert atmosphere is obtained by purging the curing zone with inert gas such as nitrogen.

Advantageously, the oxygen concentration in the curing zone is less than 1,000 ppm and preferably less than 100 ppm.

Preferably, the multi-functional material comprises one or more reactive diluents.

Conveniently, the multi-functional material comprises one or more materials, each material having a molecular weight in excess of 480.

Advantageously, the multi-functional material comprises one or more materials which have three or more functional acrylate groups.

Conveniently, the coating material contains a pre-polymer, and may comprise polyester acrylate, polyurethane acrylate, epoxyacrylate or a full acrylic material.

Conveniently, the pre-polymer is multi-functional.

Advantageously, the coating composition comprises, in addition to the reactive part, a filler, and the filler may comprises clay, silica or magnetisable particles.

Preferably, the power output of the lamp is at least 180 watts/cm and may be substantially 240 watts/cm.

Conveniently, UV light from the lamp has a substantial spectral content in the range 200–300 nm.

Preferably, UV light from the lamp has additional spectral content with peaks of approximately 370 nm, 408 nm and 438 nm.

Two or more lamps may be provided in the curing zone. The lamps may have different spectral properties or may have substantially identical spectral properties.

The invention relates to a substrate when coated by a method as described above.

In order that the invention may be more readily understood, and so that further features thereof may be appreciated, the invention will now be described, by way of example, with reference to the accompanying drawings in which.

Figure 1:
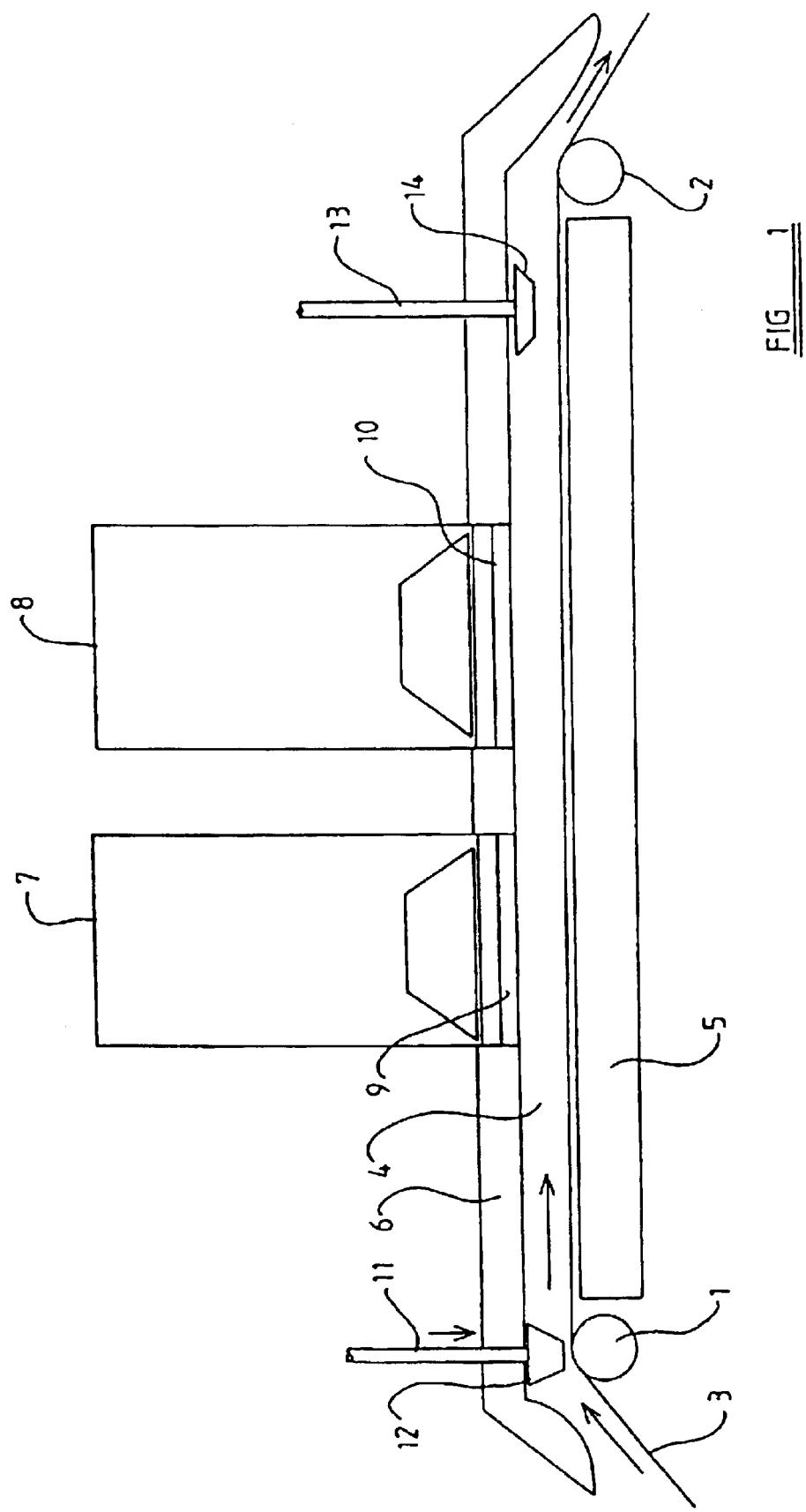
FIG. 1 is a diagrammatic view of an apparatus for use in curing a coating on a substrate.

Referring initially to FIG. 1 of the accompanying drawings, an apparatus for curing a coating applied to a substrate is illustrated.

An apparatus is illustrated which comprises a pair of rollers 1,2 adapted to guide a substrate 3, such as a sheet of aluminium foil or a sheet of paper, through the illustrated apparatus. The substrate 3 is coated, before entering the apparatus, completely or partially, with a curable composition which will be described in greater detail hereinafter. The curable composition may be applied as an un-broken coating or may be applied in the form of printing.

The rollers 1,2 guide the substrate 3 through a channel 4 defined between a cooled backing plate 5, and a super-imposed cover 6. The cover 6 supports two lamps 7,8. The lamp 7 can be a "D" lamp, as supplied by Fusion Inc. The lamp 7 is located above a quartz window 9 that is sealed against the cover 6 so that light from the lamp 7 may shine through the quartz window 9 on to the substrate 3 as it passes through a curing zone formed by the channel 4.

The lamp 8 can be a "H" lamp as supplied by Fusion Inc. and is also associated with a quartz window 10 which is formed integrally with the cover 6 so that light from the lamp 8 can pass through the quartz window 10 into the curing zone in channel 4, and thus on to the substrate 3.

The lamps 7,8 each have a focussing reflector. The position of the lamps may be interchanged. In an alternative embodiment, only one lamp may be used, or two lamps of the same type may be used.

The lamps 7 and 8 emit UV light with wavelengths in the band 200 to 550 nm. The light is directed on to the substrate in a region in the central part of the channel 4.

The channel 4 is flushed with nitrogen in order to ensure that there is an inert atmosphere having a minimum quantity of oxygen within the channel. Thus, nitrogen is introduced through an inlet conduit 11 and passes to a dispersing nozzle 12 known as the "inlet knife" which is located on the under-side of the cover 6 above the roller 1, and which is adapted to prevent oxygen entering the channel 4. The nitrogen flows along the channel 4, past the region where the UV light is directed on to the substrate, in the same direction as the direction of movement of the substrate 3. Nitrogen may also be injected into the channel 4 via nozzles located around the periphery of each quartz window. At the end of the channel 4 adjacent the roller 2 nitrogen flowing through a conduit 13 is passed through a nozzle 14 on the underside of the cover into the channel 4. Thus, there is a continuous flow of nitrogen within the channel 4 such that the concentration of oxygen within the channel 4 is less than 1,000 ppm and preferably less than 100 ppm. Instead of using nitrogen, other inert gases could be used. However, nitrogen is preferred because it is the least expensive inert gas.

The lamps 7 and 8 are supplied in a modular form, each module is 25.4 mm wide and extends transversely across the direction of movement of the web 3 through the channel 4. The lamps are high intensity lamps using medium pressure mercury vapour bulbs operating at a power level in excess of 140 watts per linear centimeter, preferably in excess of 180 watts per linear centimeter, and most preferably in the region of 240 watts per linear centimeter.

Figure 2:
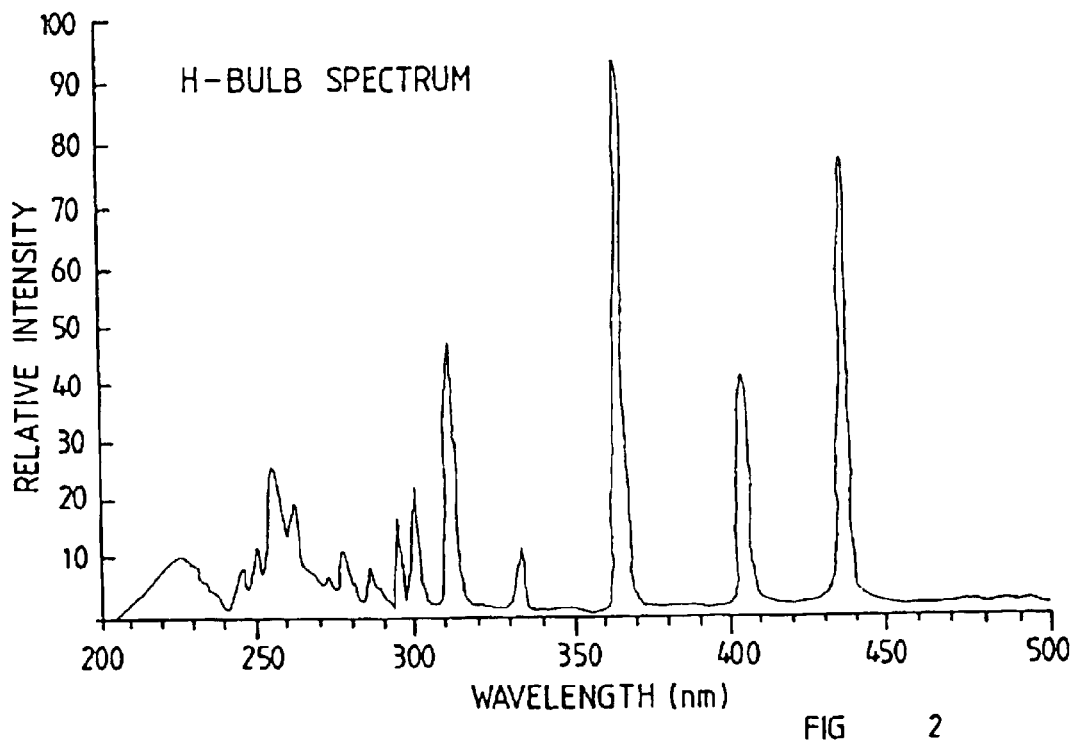
FIG. 2 is a graphical indication of the spectral output of a preferred UV lamp.

The output spectrum of the "D" lamp 7 is illustrated in FIG. 2. It can be observed that the spectrum has a substantial spectral content within the range of 350–450 nm, with specific peaks at 355, 370, 383 and 408 nm. There is spectral content in the region of 200–350 nm, although the spectral content in the 200–250 nm range is minimal.

Figure 3:
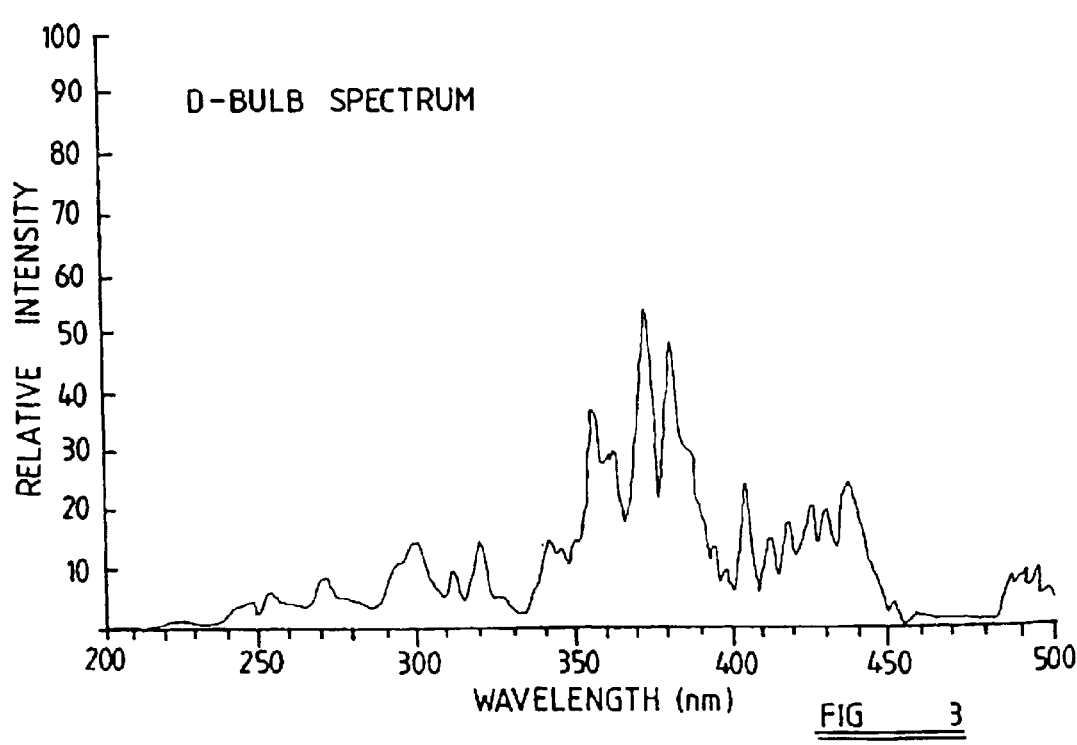
FIG. 3 is a graphical representation of the spectral output of an alternative preferred UV lamp.

The spectrum of the "H" lamp 8 is illustrated in FIG. 3. It can be seen that the spectrum has substantial spectral content in the region of 200–300 nm, with the spectral content at the longer wavelengths being restricted to isolated peaks at 312 nm, 370 nm, 408 nm and 438 nm. The spectral content in the region of 200–300 nm comprises a very broad peak centred on 225 nm and spanning the area from 210–240 nm and a further relatively broad peak, which is less clearly defined, but which is substantially centred on 262 nm and effectively spans the range of 240–280 nm. It is believed that this very substantial spectral content at these very short wavelengths plays a significant role in creating free radicals to initiate polymerisation. The very high energy present in the well defined peaks at higher frequencies may also contribute.

The reactive part of the curable coating that is applied to the web 3 does not contain a photo-initiator, but does contain a substantial proportion (between 30% and 100% by weight) of multi-functional radiation curable elements. A multi-functional radiation curable element is a radiation curable element which comprises two or more functional groups. Functional groups are acrylate groups with C=C double bonds. If functionality is expressed as a number, the number indicates the number of C=C double bonds available to react, present in acrylate groups.

The radiation curable elements are preferably of low viscosity and can be considered to be reactive diluents, not only providing reactive capabilities, but also maintaining, in the unreacted state, the desired liquid properties of the coating material.

It is preferred that the average molecular weight of any single multi-functional radiation curable element utilised in the curable coating should be greater than 480. It has been found that relatively low molecular weight radiation curable elements may give rise to skin irritation. It is, however, believed that by utilising a molecular weight greater than 480, the risk of skin irritation arising is substantially reduced or obviated.

Figure 4:
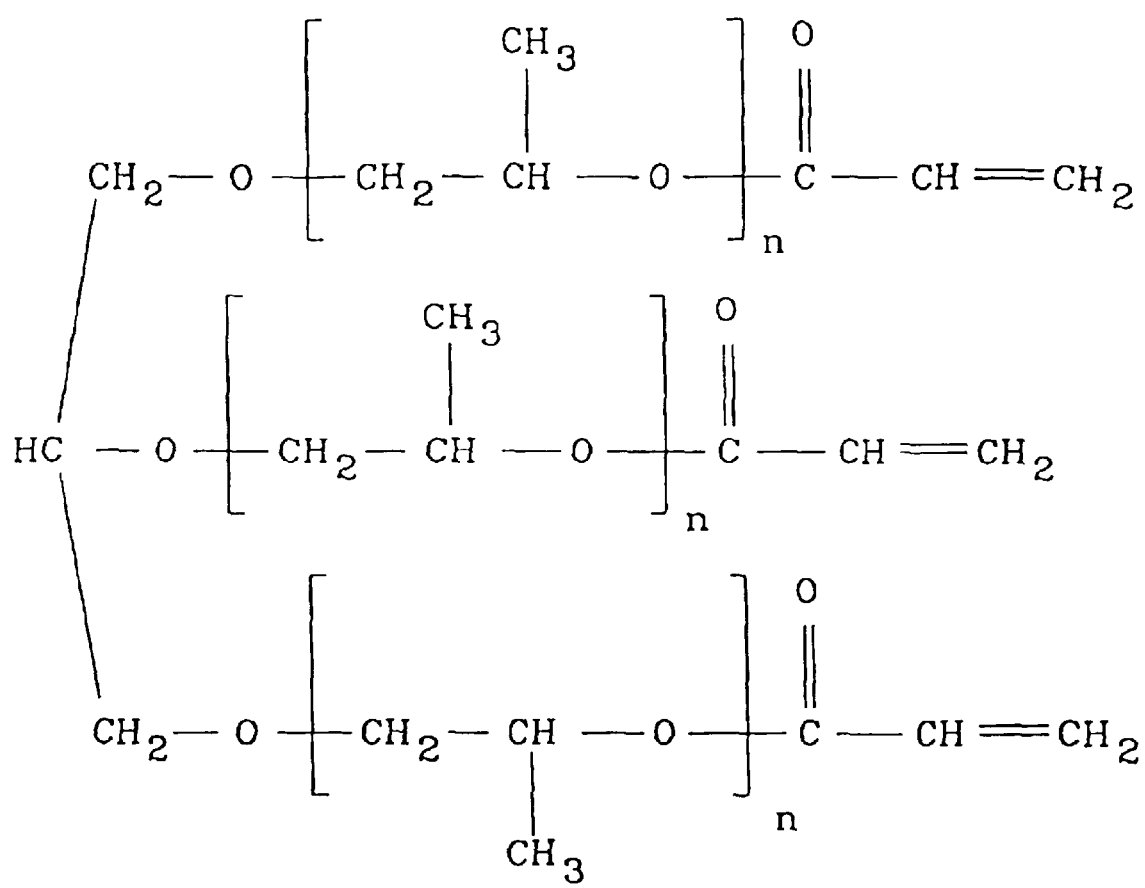
FIG. 4 shows the chemical structure of a reactant.

Typical examples of multi-functional radiation curable reactive diluents are propoxylated pentaerythritol tetra-acrylate or ethoxylated pentaerythritol tetra-acrylate. An alternative material comprises "OTA 480", a triacrylated low viscosity material available from UCB Chemicals of Anderlecht Str. 33, B-1620 Drogenbos, Belgium. The structure of OTA 480 is shown in FIG. 4.

The curable coating may optionally comprise, in addition to the reactive part, a non-reactive part or filler that may comprise clay or silica. In some cases, where the coating is to have magnetic properties, the filler may comprise metal particles that may be magnetised.

It is believed that the very high intensity UV radiation applied by the lamps to the curable material generates sufficient free radicals to initiate the curing of the coating.

As the reaction takes place within the substantially inert atmosphere, it is thought that even though a relatively low number of radicals may be produced, because of the high functionality of the coating material, and because the radicals are not subject to oxygen quenching, the radicals that are available to initiate the reaction are sufficient to enable the reaction to proceed very rapidly. Although multi-functional materials, where functionality is greater than 3, are highly reactive, they are believed to undergo a relatively low level of conversion to form a fully cured coating, when compared to mono or di-functional materials.

It is believed that the physical properties of a coating formed solely from multi-functional reactive diluents of low viscosity, whilst sufficient for many purposes, may not be considered sufficient for use as a high performance coating. In order to produce a coating formulation that exhibits solvent resistance and stain resistance, it has been found appropriate to combine, with the reactive diluents, a pre-polymer which preferably contains some unsaturation. A pre-polymer is a reactive material of relatively high viscosity. A pre-polymer, when used alone, does not exhibit liquid properties that are appropriate for a coating material that could be used for example in a direct gravure coating process. Examples of suitable pre-polymers are polyester acrylates, polyurethane acrylates and epoxy acrylates. The functionality of these materials is normally 2 or 3 but can be up to 6. It is thought that the higher the functionality of the pre-polymers, the faster the curing performance of the coating.

EXAMPLE 1

A series of multi-functional materials were coated on to aluminium foil at a coat weight of approximately 10 g/m$^2$. The coated foil was passed through a curing apparatus, similar to that shown in FIG. 1, but with only one lamp at a speed of 20 m/min. Initially, the lamp was an "H" lamp, and subsequently the experiment was repeated using a "D" lamp. The lamps were each operated at a power level of 240 watts/centimeter. The cured coating was subsequently tested using an acetone rub test utilising a SATRA rub tester. Such a tester provides an indication of the degree of curing. Solvent resistance is indicated as the number of double rubs effected before the coating applied to the aluminium foil is removed. The greater the number of rubs, the more solvent resistant is the coating.

The results are set out in Table 1.

TABLE 1

|  | Solvent Resistance - Acetone rubs | |
| --- | --- | --- |
| Coating Composition | H Bulb | D Bulb |
| Di and Triacrylates | | |
| Tripropan-glycol-diacrylate (UCB) | <2 | <2 |
| 1,6-hexanediol diacrylate (UCB) | 25 | <2 |
| OTA 480 triacrylate (UCB) | 40 | <2 |
| Tetra-acrylates | | |
| Ebecryl 40 (UCB) | 95 | <2 |
| Ethoxylated-pentaerythritol tetra-acrylate (Croda) | 45 | <2 |
| Tetra-acrylate with pre-polymer | | |
| Actilane 320 PP 50 Epoxy acrylate with 50% Propoxylated-pentaerythritol tetra-acrylate (Ackros) | 150 | <2 |

Ebecryl 40 is a tetra-functional acrylated reactive diluent available from UCB Chemicals. The ethoxylated pentaerythritol tetra-acrylate was obtained from Croda Resins Ltd. of Crabtree Manorway, South Belvedere, Kent DA17 6BA. Actilane 320 pp 50 is obtained from Ackros Chemicals, Eccles Site, Bentcliffe Way, P.O. Box 1, Eccles, Manchester M30 0BH.

Example 1 shows that when the coating composition comprises only a di-acrylate, the solvent resistance has a very low value. When tri-acrylates or tetra-acrylates are utilised, a much greater degree of solvent resistance is achieved. When a tetra-acrylate mixed with a pre-polymer is utilised, there is substantial improvement in the performance of the cured coating. This is believed to be due to the introduction of higher molecular weight epoxy groups in the cross-linked structure of the coating.

EXAMPLE 2

A coating of HH52-0103 02 EBC foil coating material obtained from Glasurit GmbH, Postfach 6123, D-48136 Muenster, Germany, was applied at a coat weight of approximately 10 g/m$^2$ to an aluminium foil. This material comprises a relatively small proportion epoxy acrylate and a relatively large proportion of ethoxylated pentaerythritol tetra-acrylate. The coated foil was passed at various speeds through a curing apparatus similar to that shown in FIG. 1 but with only a single "H" lamp 7 operating. In an initial series of experiments, the "H" lamp was operated at a power of 240 watts per centimeter and in another series of experiments the "H" lamp was operated at a power of 160 watts per centimeter. The acetone rub test as described with reference to Example 1, was subsequently used to indicate the degree of curing. The results are shown in Table 2.

TABLE 2

|  | Solvent Resistance Acetone rubs | |
| --- | --- | --- |
| Speed | @ 240 W/cm | @ 160 W/cm |
| 30 M/min | 100 | 11 |
| 40 M/min | 35 | 9 |
| 50 M/min | 9 | 1 |
| 60 M/min | 4 | 1 |

Example 2 illustrates that the degree of curing of the coating is improved when the coating is provided with a substantial energy input in the UV spectrum. The best results are achieved with a relatively low speed of movement of the substrate through the curing apparatus and with the application of very intense high energy light. It can be seen that it is important, for a satisfactory cure to be achieved, for there to be a sufficient power input for a sufficient period of time. The degree of cure achieved does not increase linearly with lower speed of passage through the curing zone (i.e. does not increase linearly with the exposure time to intense UV light). As can be seen, especially at 240 watts per centimeter, the degree of cure achieved increases very substantially, almost exponentially, with increased residence time in the curing zone.

It is believed that an even higher degree of cure can be achieved utilising two lamps within the curing zone. This is shown in Example 3 where the same coating is applied and cured using two lamps at a much higher speed.

EXAMPLE 3

A coating of HH52-0103 02 EBC foil coating material was coated on to a printed paper (Paper 13-2606), using a gravure coating unit at a coat weight of approximately 8 g/m$^2$ and a run speed of 80 meters per minute. The coated paper was passed through a UV curing apparatus of a type illustrated in FIG. 1 flushed with nitrogen gas to as to achieve a residual oxygen level within the curing region of less than 100 ppm. The curing zone was illuminated, through quartz windows, by two high intensity UV lamps, one "H" bulb and one "D" bulb utilising focus-reflectors to direct UV light on to the coating to cure it to form a dry film, the two lamps operating at a power of 240 watts per linear centimeter.

The solvent resistance was greater than 50 acetone rubs (measured as in Example 2).

To test the performance of the coated paper as a furniture surfacing material, a sample of the coated paper was laminated, using aminoplast adhesive, on to a piece of chipboard. Then stain and scratch tests were carried out using the techniques described in ISO 4211. For comparison purposes, the test run was repeated, adding to the coating material the photo-initiator recommended by, and obtainable from, Glasurit GmbH, which is a methyl-phenyl-glyoxylate identified as SR07 641H. This coated paper was also laminated to a piece of chipboard using aminoplast adhesive. For further comparison, a sample of commercially available furniture foil which had been lacquered using a water-based amino polyester lacquer and then thermally cured, was also laminated, using aminoplast adhesive, to chipboard to represent a current commercially acceptable industry performance standard.

The results are given in Table 3, where stain resistance is indicated on a 1–5 scale (5 being the best result and 1 being the worst result).

TABLE 3

ISO 4211 Stain Resistance

| Test Liquid | Thermal Cured Lacquer | UV No. Photoinitiator | UV + 0.5% SR07-641H |
|---|---|---|---|
| Acetic Acid | 3.0 | 3.0 | 2.0 |
| Acetone | 3.0 | 3.0 | 3.0 |
| Ammonia solution | 3.0 | 3.0 | 3.0 |
| Blackcurrant juice | 3.0 | 3.0 | 3.0 |
| Citric acid | 3.0 | 3.0 | 3.0 |
| Cleaning agent | 3.5 | 3.0 | 3.0 |
| Coffee | 3.0 | 3.5 | 3.5 |
| Disinfectant (DETTOL) | 3.5 | 4.0 | 4.0 |
| Disinfectant (SAVLON) | 3.0 | 4.0 | 4.0 |
| Endorsing ink | 4.0 | 3.0 | 3.0 |
| Ethanol | 3.5 | 3.5 | 3.5 |
| Ethyl/Butyl acetate | 3.5 | 3.5 | 3.0 |
| Iodine | 4.0 | 3.0 | 3.0 |
| Milk (condensed) | 3.0 | 3.0 | 3.0 |
| Olive Oil | 3.5 | 3.5 | 3.5 |
| Paraffin oil BP | 3.5 | 3.5 | 3.0 |
| SBP Spirit | 4.0 | 3.0 | 3.0 |
| Sodium carbonate | 4.0 | 4.0 | 4.0 |
| Sodium chloride | 4.0 | 4.0 | 3.0 |
| Tea | 4.0 | 4.0 | 3.5 |
| Water | 3.5 | 3.5 | 3.0 |
| TOTALS: | 72.5 | 71.0 | 67.0 |

Example 3 indicates that a coating composition in accordance with the present invention, with no photo-initiator, provides a superior performance to a coating composition which does include a photo-initiator. The performance achieved by the material of the present invention is very similar to the performance achieved by the industry-acceptable-standard utilised for comparison purposes. Furthermore, by utilising a preferred combination of UV lamp power, spectrum and reactive materials, the process can operate at higher speeds.

Consequently, it is believed that the present invention provides a method of producing an industry-acceptable material without the use of photo-initiators, but whilst still providing the other advantages of UV curing.

The coating techniques described above have been found to be particularly suitable for applying coatings to flexible papers or films, such as papers or films produced on high speed coating and printing machines. The coatings have been found to be especially valuable for use on surfaces that are found in the home environment. Thus, the coatings may be applied to surfacing materials intended for application to furniture, walls, floors and ceilings. However, it is to be understood that the method described above may be utilised for less demanding coating applications, such as varnishes for books, magazines or record sleeves. The method described above may also be utilised for fabricating coated materials for use in packaging where low odour coatings, or coatings which do not impart a "taste" to products, are of particular value.

What is claimed is:

1. A method of coating a substrate, the method comprising applying a coating composition to at least selected areas of the substrate,
exposing the coated substrate to ultra-violet light from at least one lamp having a power output of at least 140 watts per linear centimeter in a curing zone, to initiate curing of the coating, the coating composition comprising a mixture including at least a reactive part comprising at least 30% by weight multi-functional component, said multi-functional component consisting of at least one material, at least one component of said at least one material having at least three functional acrylate groups, and said coating composition being photo-initiator free, including maintaining a substantially inert atmosphere in the curing zone where the substrate is exposed to said ultra-violet light, so as to obtain at least an acetone solvent resistant coating.

2. A method according to claim 1, wherein the inert atmosphere is obtained by purging the curing zone with inert gas, wherein said gas does not react with said coating.

3. A method according to claim 2 wherein the inert gas comprises nitrogen.

4. A method according to claim 1, wherein an oxygen concentration of the curing zone is less than 1,000 parts per million.

5. A method according to claim 4, wherein the oxygen concentration is less than 100 parts per million.

6. A method according to claim 1, wherein the multi-functional material comprises one or more reactive diluents.

7. A method according to claim 1, wherein the multi-functional component comprises one or more materials, the one or more materials each having a molecular weight in excess of 480.

8. A method according to claim 6, wherein the coating composition additionally contains a pre-polymer.

9. A method according to claim 8 wherein the pre-polymer comprises polyester acrylate, polyurethane acrylate, epoxyacrelate, or a full acrylate material.

10. A method according to claim 8 wherein the prepolymer is multi-functional.

11. A method according to claim 1 wherein the coating composition comprises, in addition to the reactive part, a filler.

12. A method according to claim 11 wherein the filler is clay.

13. A method according to claim 11 wherein the filler is silica.

14. A method according to claim 11 wherein the filler is magnetisable particles.

15. A method according to claim 1 wherein the power output of the lamp is at least 180 watts/cm.

16. A method according to claim 15 wherein the power output of the lamp is substantially 240 watts/cm.

17. A method according to claim 1, wherein UV light from the lamp has a substantial spectral content in a range of 200–300 nm.

18. A method according to claim 17 wherein UV light from the lamp has a spectral content at peaks of approximately 370 nm, 408 nm and 438 nm.

19. A method according to claim 1 wherein two lamps are provided in the curing zone, the lamps having different spectral properties.

20. A method according to claim 1 wherein two lamps are provided in the curing zone, the lamps having substantially identical spectral properties.

21. A substrate when coated by a method according to claim 1.

22. A method according to claim 2, wherein the inert gas does not subject free radicals to oxygen quenching.

23. A method of coating a substrate, the method comprising applying a coating composition to at least selected areas of the substrate, exposing the coated substrate to ultra-violet light from at least one lamp having a power output of at least 140 watts per linear centimeter in a curing zone, to initiate curing of the coating, the coating composition comprising a reactive part, the reactive part comprising at least 30% weight multi-functional component said multi-functional component consisting of at least one material, at least one component of said at least one material having a functionality of at least three, wherein the multi-functional component comprises at least one material having at least three functional acrylate groups, and being photo-initiator free, including maintaining a substantially inert atmosphere in the curing zone where the substrate is exposed to said ultra-violet light, so as to obtain an at least an acetone solvent resistant coating.

\* \* \* \* \*